Feb. 11, 1930.   N. E. SIEGLE   1,746,744
METHOD AND APPARATUS FOR CUTTING TAR OR OTHER PLASTIC MATERIALS
Filed Aug. 13, 1928

INVENTOR.
Norman E. Siegle

BY
ATTORNEY.

Patented Feb. 11, 1930

1,746,744

UNITED STATES PATENT OFFICE

NORMAN E. SIEGLE, OF COLUMBUS, OHIO

METHOD AND APPARATUS FOR CUTTING TAR OR OTHER PLASTIC MATERIALS

Application filed August 13, 1928. Serial No. 299,429.

My invention relates to method and apparatus for cutting tar or other plastic materials. It has to do, more particularly, with a means for severing the block or barrel of tar or other plastic material into portions easily melted and readily handled preliminary to the melting operation.

In the past, it has been customary to separate a drum of tar or other plastic material by chopping. The average drum of tar weighs approximately four hundred pounds and it is generally encased either in tin or sheet iron. The operation of separating such a drum of tar is an extremely arduous one. The average street construction gang ordinarily maintains one man for the sole purpose of cutting up these drums and he ordinarily cuts up about ten drums per day.

In thus reducing the tar to proper size for melting, it is customary to use an axe and to heat the axe prior to the chopping operation. The axe handles become burnt after several of these heating operations so that they become useless. Furthermore, this method is wasteful, owing to the fact that, in cold weather, the tar is hard to chop because of its comparatively stiff consistency and will frequently chip and fly in all directions. In warm weather, it is also hard to chop because of its sticky nature. The time consumed in chopping drums of tar varies somewhat with the weather conditions and with the operator but averages approximately forty-five minutes per drum.

I have devised a novel method and apparatus for reducing a drum of tar to portions of appropriate size for melting which will enable one operator to effect such reduction in less than five minutes. Furthermore, my method and apparatus are such that a drum of tar, either with or without a metal casing thereon, may be separated into portions of appropriate size without danger of flying particles.

In its preferred form, the apparatus which I utilize comprises a platform for the reception of a drum of tar. It also includes an upright design to serve as a fulcrum member for a blade which may be manipulated to sever the drum of tar, first in one plane and then in another.

More specifically, I preferably use an apparatus wherein the platform for receiving the drum of tar is provided with a peripheral channel for the reception of a band which supports a notched upright. This band is rotatable about the platform, so that the upright may be swung around the periphery of the platform to different positions. With this structure, the knife may be caused to cut first through the tar at one angle and then may be shifted to any other desired angle or angles for additional cutting operations. The knife blade is adjustably fulcrumed upon the upright by placing its fulcrum pin in any one of the notches in this upright.

The preferred embodiment of my invention is shown in the accompanying drawings wherein similar characters of reference designate corresponding parts and wherein.

Figure 1:
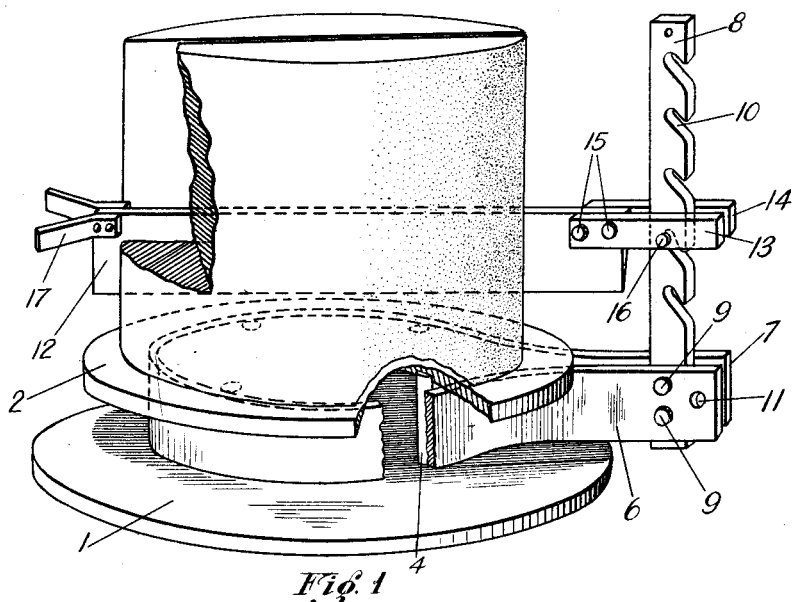
Figure 1 is a perspective view of the apparatus preferably utilized by me in severing tar and similar substances by my method.
Figure 2:
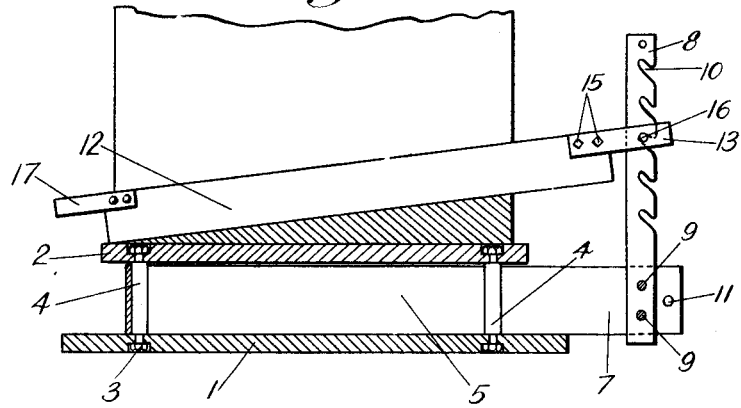
Figure 2 is a vertical section taken through my platform structure and illustrating the apparatus shown in Figure 1.

In the drawings, I have shown a platform structure which is made up of a disc-like base 1, although it is not limited to this form and may take any desired shape, and a superposed platform disc 2. These discs 1 and 2 are preferably spaced apart by means of bolts 3 and sleeve members 4 carried thereon. The heads of the bolts are disposed in countersunk openings in the respective discs and the sleeves 4 fit in between the discs 1 and 2 and space them apart.

The sleeve-enclosed bolts are preferably disposed in spaced relation and at uniform distances from the peripheries of the discs 1 and 2. These discs 1 and 2 are concentrically disposed with relation to each other.

These sleeve-enclosed bolts are set in such a distance from the peripheries of the members 1 and 2 that the platform structure as a whole has a peripheral channel for the reception of a band 5.

This band 5 is best shown in Figure 1 and its inner surface lies in intimate contact with the rotatable sleeve members 4 of the bolts 3. The free ends of this band extend radially out from the platform in parallelism with each other to form legs 6 and 7.

An upright 8 is preferably mounted between these legs by means of bolts 9. This upright is provided on its outer edge with a plurality of undercut notches 10, these notches being preferably spaced apart at regular intervals. This upright is normally vertical but may be adjusted to angular position by removing the upper bolt 9, swinging the upright outwardly and downwardly and then placing this upper bolt 9 through the aligning openings 11 in the parallel legs of the band structure 5.

The knife blade structure is shown best in Figure 1 and it preferably comprises the blade proper, designated 12, and several supplementary parts. One of these supplementary parts is a bifurcated structure formed by parallel members 13 and 14 secured to the blade by bolts 15. This bifurcated member preferably embraces the upright 8 and is provided with a cross-pin 16 spaced an adequate distance from the adjacent end of the knife blade. The knife blade is further provided with a handle 17 that may take any desired form.

In operation, a drum of tar is placed upon the disc 2 and the knife blade, preferably, although not necessarily, previously heated, is so adjusted that the fulcrum pin 16 is disposed in that notch 10 of the upright 8 which is most appropriate for initiating cutting of the particular height drum. The knife blade is preferably so disposed at the time the cutting operation is initiated that the blade is angularly disposed with its inner portion in contact with that portion of the drum which is adjacent the upright. Pressure is then applied to force the handle of the knife blade downwardly. It is ordinarily forced downwardly to such an extent that it becomes inclined downwardly from its fulcrum point. When it has been forced downwardly to the proper degree, it is preferably readjusted so as to place the fulcrum pin in a lower notch and downward pressure is again applied to the handle of the blade. When the drum has been completely severed by a succession of these operations, the knife is then upwardly adjusted until it is above the drum and the band 5 is rotated so as to cause the upright to assume a different location about the circumference of the drum and platform. The drum is then again severed by the succession of operations just described.

It will be understood that the use of the rotatable sleeve members 4 facilitates the swinging of the upright about the platform. It will likewise be apparent that the arcuate path of movement of the blade produces a shearing cut upon the drum of tar or other material and the extent of this shearing action may be varied by adjusting the upright to an angular position as previously described.

I believe that I am the first to appreciate that these drums of tar may be separated into portions of appropriate size by forcing a blade therethrough instead of by chopping. It is within the broad aspect of my invention to accomplish this merely by using a blade alone and applying downward pressure to both ends of this blade, preferably applying pressure first to one end of the blade and then to the other. The blade may or may not be heated but, in those tests which I have made to date, I have found that the heating of the blade facilitates the performance of my method.

As far as the apparatus shown is concerned, it will be apparent that I have provided a means whereby one man may sever a drum of tar in approximately one-ninth of the time required by the usual chopping operation. In my apparatus, the provision of an upright with a plurality of fulcrumed notches makes possible the obtaining of the most desirable leverage action. Likewise, the manner of mounting the upright upon the platform produces a comparatively rigid structure which may, nevertheless, be readily adjusted to cut at any desired angle.

Having thus described my invention, what I claim is:

1. Apparatus for separating drums of tar or similar material into smaller portions comprising a platform for supporting the drum, an upright carried by said platform, a knife blade adjustably fulcrumed on said upright, said upright being adjustable around said platform.

2. Apparatus for separating drums of tar or similar material into smaller portions comprising a platform for supporting a drum, said platform comprising superposed members, rotatable sleeve members for spacing said members apart, a band member for embracing and contacting with said rotatable sleeve members, an upright carried by the outer ends of said band member, and a knife blade fulcrumed upon said upright.

3. Apparatus for separating drums of tar or similar material into smaller portions comprising an upright, means for supporting said upright, a knife blade fulcrumed upon said upright, and means for adjusting said upright to angular position.

4. The method of separating drums of tar or similar material into smaller portions which comprises severing by forcing a rigid blade through the tar with a steady applied pressure.

5. The method of separating drums of tar or similar material into smaller portions which comprises severing by forcing a heated rigid blade through the tar by a steady applied pressure.

6. The method of separating drums of tar or similar material into smaller portions which comprises severing by forcing a rigid blade through the tar with a downward swinging action and by means of a steadily applied pressure.

7. An apparatus for separating a drum of tar or similar material into smaller portions comprising a support for a drum of tar, an upright, and a knife-blade fulcrumed on said upright, said support and said upright being so mounted as to be capable of movement relative to each other about a common axis thereby enabling the knife-blade to sever portons from the drum of tar at any angle relative thereto.

8. An apparatus for separating a drum of tar or similar material into smaller portions comprising a support for a drum of tar, a fulcrum member, and a knife-blade adjustably fulcrumed on said fulcrum member, said support and said fulcrum member being so mounted as to be capable of movement relative to each other about a common axis thereby enabling the knife-blade to sever portions from the drum of tar at any angle relative thereto.

9. An apparatus for separating a drum of tar or similar material into smaller portions comprising a support for a drum of tar, a fulcrum member, and a knife-blade of such size as to engage opposed points on the periphery of the drum of tar fulcrumed on said fulcrum member, said support and said fulcrum member being so mounted as to be capable of movement relative to each other about a common axis thereby enabling the knife-blade to sever portions from the drum of tar at any angle relative thereto.

In testimony whereof I hereby affix my signature.

NORMAN E. SIEGLE.